United States Patent [19]

Crowe

[11] 4,227,423
[45] Oct. 14, 1980

[54] LINE GRIPPING PULLEY FOR A LINE HAULER

[76] Inventor: Robert E. Crowe, Rockland Industrial Park, Rockland, Me. 04841

[21] Appl. No.: 898,641

[22] Filed: Apr. 21, 1978

[51] Int. Cl.² .................... F16H 55/36; F16H 55/46
[52] U.S. Cl. ................................ 474/177; 474/182; 474/903
[58] Field of Search ............... 74/230.5, 230.7, 230.15, 74/230.11, 230.13, 230.14, 229, 443, 230.24

[56] References Cited

U.S. PATENT DOCUMENTS

| 600,857 | 3/1898 | Collett | 74/230.5 X |
|---|---|---|---|
| 1,017,553 | 2/1912 | Jones | 74/230.5 |
| 1,619,793 | 3/1927 | Kerr | 74/230.11 |
| 2,139,622 | 12/1938 | Lonskey | 74/230.5 |
| 2,184,545 | 12/1939 | Collier | 74/230.7 |
| 2,217,044 | 10/1940 | Clark | 74/230.7 |
| 2,413,817 | 1/1947 | Firth | 74/230.15 |
| 2,655,813 | 10/1953 | Howell | 74/230.5 |
| 3,100,070 | 8/1963 | Smith | 74/230.5 X |
| 3,494,212 | 2/1970 | Thomson | 74/230.7 |
| 3,946,618 | 3/1976 | Green | 74/230.7 X |

FOREIGN PATENT DOCUMENTS

| 572246 | 6/1924 | France | 74/230.11 |
|---|---|---|---|
| 481163 | 5/1953 | Italy | 74/230.5 |
| 4999 | of 1880 | United Kingdom | 74/230.5 |
| 3059 | of 1895 | United Kingdom | 74/230.5 |
| 17854 | of 1903 | United Kingdom | 74/230.7 |
| 416031 | 9/1934 | United Kingdom | 74/230.5 |

Primary Examiner—Leslie Braun

[57] ABSTRACT

A line gripping pulley for a line hauler includes a pair of identical backing discs and a pair of identical wear discs, one for each backing disc and held thereagainst when the discs are assembled and clamped together.

4 Claims, 4 Drawing Figures

LINE GRIPPING PULLEY FOR A LINE HAULER

BACKGROUND REFERENCES

U.S. Letters Pat. No. 2,184,545
U.S. Letters Pat. No. 2,413,817
U.S. Letters Pat. No. 3,494,212
U.S. Letters Pat. No. 3,946,618

BACKGROUND OF THE INVENTION

The pulleys or sheaves of line haulers used by marine fishermen in hauling lobster pots, for one important example, are hydraulically driven. In practice, the pulleys are formed by two discs that are clamped together and attached to a drive shaft with the proximate faces of the two discs defining a narrow V with the greater pull on the line, the greater the penetration of the line into the V and, accordingly, the greater the grip on the line.

The pulleys used in such line haulers vary in diameter and the discs are steel stampings and in use the pulleys are subject both to wear and corrosion. As a consequence, such pulleys must be replaced from time-to-time. As replacement costs are substantial, special discs offering a longer, useful life are available with such discs being of high tensile, manganese bronze. All such special discs are relatively expensive.

THE PRESENT INVENTION

The general objective of the present invention is to provide pulleys for line haulers that eliminate the need for pulley replacements, an objective attained by providing for such pulleys, replaceable and relatively thin wear discs as resiliently flexible facings for the steel, pulley-establishing backing discs which are preferably of stainless steel.

A further objective of the invention is to ensure that the wear discs are properly supported by the backing discs throughout their lives, an objective attained by so shaping the wear discs that they so closely conform to the size and shape of the backing discs that they are held by their peripheries slightly spaced therefrom but become resiliently seated thereagainst when the assembled backing and wear discs are clamped together.

BRIEF DESCRIPTION OF THE DRAWINGS

In the accompanying drawings a preferred embodiment of the invention is illustrated and—

THE PREFERRED EMBODIMENT OF THE INVENTION

Figure 1:
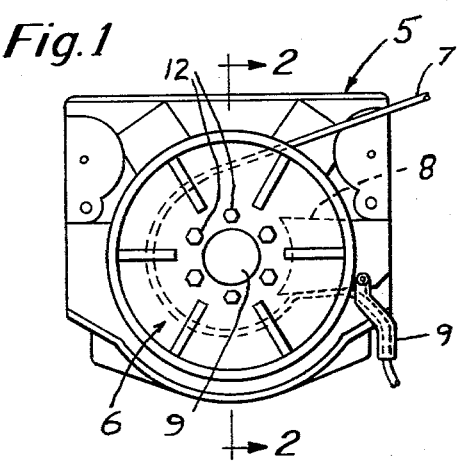
FIG. 1 is a front elevation of a line hauler in accordance with the invention.
Figure 3:
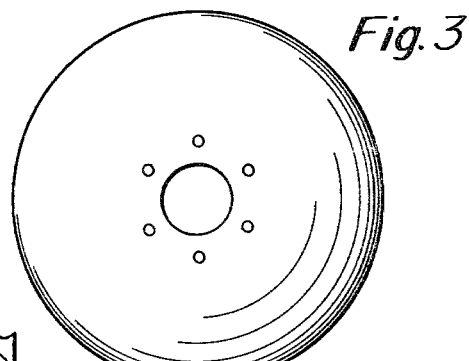
FIG. 3 is a view of the working face of a wear disc.
Figure 2:
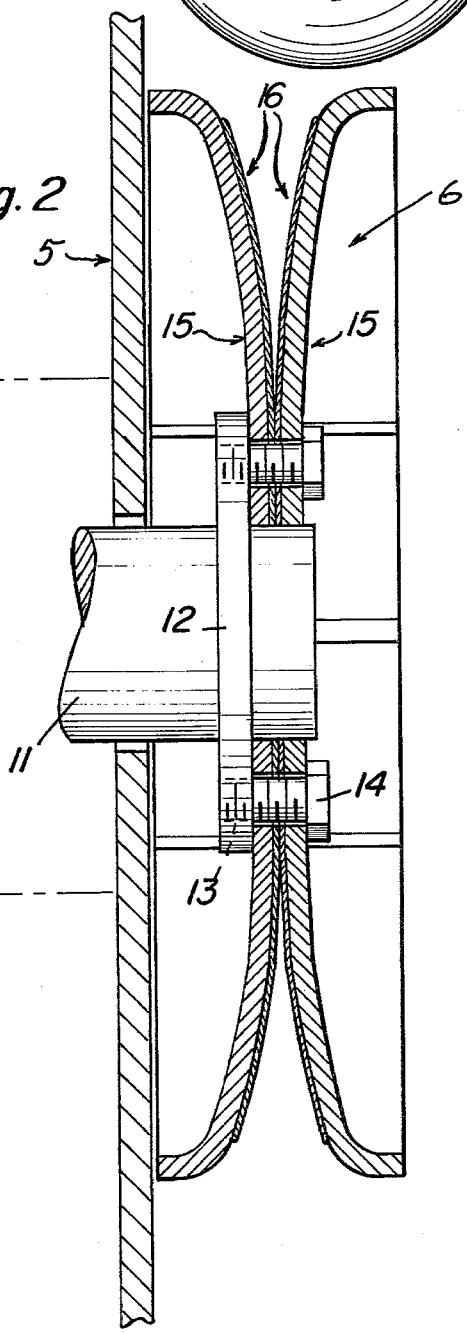
FIG. 2 is a section, on an increase in scale taken approximately along the indicated line 2—2 of FIG. 1.

A line hauler in accordance with the invention has a mount 5 to be fixed in the boat as to a bulkhead, a wash rail, or any other position on the deck or within the cockpit thus to place the axis of the pulley, generally indicated at 6 in a selected position which may be horizontal, vertical, or at a 45° angle. The line 7 is trained about the pulley 6 in the manner illustrated by FIG. 1. The line hauler is provided with a releasing blade 8 and a rope deflector 9 attached to the mount 5 with the release blade 8 positioned to force the line from the pulley 6 and the deflector disposed to deflect the line into or out of the boat.

The mount 5, as is conventional, supports on its rear side a hydraulic motor 10 which is shown only partly and in phantom with its drive shaft 11 extending outwardly through the mount 5 and provided with a flange 12 adjacent but spaced from its outer end. The flange 12 has a circumferentially spaced series of bores 13 threaded to receive bolts 14.

The pulley 6 includes a pair of identical backing discs 15 that are generally concavo-convex, stainless steel stampings of substantial thickness with their convex faces proximate and a pair of wear discs 16, one for each backing disc. The wear discs 16 are also generally concavo-convex with their convex faces proximate. The discs 15 and 16 have axial holes 17 and 18, respectively, to enable them to be fitted on the outer end of the shaft 11. The discs 15 and 16 are provided with a circumferentially spaced series of bores 19 and 20, respectively, located and dimensioned to register with the bores 13 of the shaft flange 12 thus to enable the backing and wear discs to be clamped thereto by the bolts 14 to form the pulley 6.

The backing discs 15 have their proximate faces so spaped as to provide an inner flat portion 15A, an intermediate portion 15B that is inclined away from the plane thereof, and an outer portion that is sharply curved to provide a rim 15C extending substantially at right angles to said plane and away therefrom so that when a pulley is assembled, its backing discs 15 establish a narrow and relatively deep V-shaped annular channel.

Figure 4:
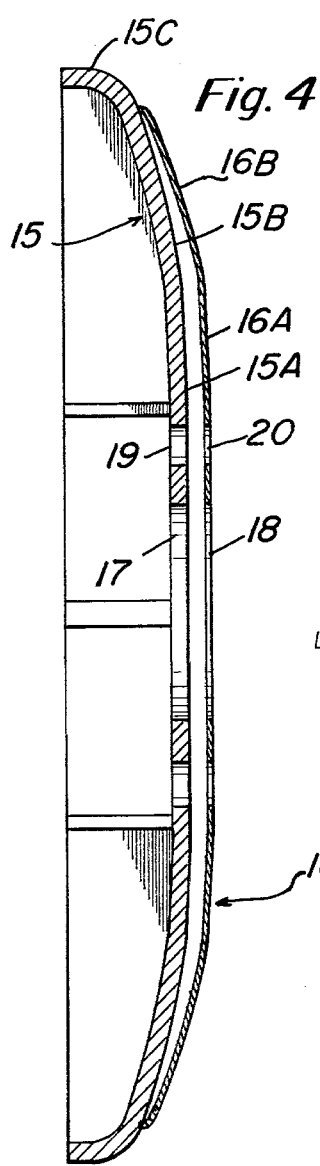
FIG. 4 is a section, similar to FIG. 2 showing the relationship between a wear disc and its backing disc before they are clamped together.

The wear discs 16 are preferably thin metal stampings, desirably carbon steel stampings, and are relatively thin and flexible, their thickness in the approximate range of 1/32 to ⅛ of an inch. Each disc 16 includes a central flat portion 16A and an outwardly curved portion 16B. As will be apparent from FIG. 4, the shape of the discs 16 is such that each does not conform exactly to that of the discs 15 as the outer margins of the portions 16B are so shaped as to space the central portion 16A from the central portion 15A of the disc 15 by which it is to be backed. The spacing is exaggerated in FIG. 4 as it may be in the order of one-quarter inch.

With the discs assembled on the shaft with each wear disc 16 in a position to be reinforced by a backing disc 15, when the bolts are secured, the discs 16 are forced and resiliently held fully seated against the backing discs 15.

The wear discs 16 may be of a suitable plastic, polyurethane, for example, but carbon steel discs are preferred as they have good line-gripping characteristics but they need replacement on much the same basis as the pulleys now in use. The cost of replacement wear discs 16 is relatively small and thus replacement is quickly and easily effected. It should be noted that in an emergency, the pulley may be used without wear discs although its line-gripping characteristics would be substandard.

I claim:

1. A line gripping pulley for a line hauler for marine use, having a drive shaft with a free end and a flange close to but adjacent said end, said pulley including a pair of identical metal backing discs and a pair of identical thin and resilient and relatively flexible steel wear discs, one for each braking disc, each backing disc including an inner flat portion, an intermediate portion that is inclined away from the plane defined by the inner portion, and an outer portion sharply curved to provide a rim extending away from said plane, each wear disc including an inner flat portion to overlie the inner portion of a backing disc and an outer portion dimensioned to overlie the intermediate portion thereof, the flat portions of each disc having an axial hole to accommodate said shaft end and a circular series of holes enabling said discs to be bolted to said shaft flange with the wear discs proximate and said rims disposed away from each other, the intermediate portion of the backing disc holding the outer portions of the wear disc to provide a narrow, V-shaped line receiving and line gripping channel dimensioned at its mouth freely to receive the line, at least the marginal portions of the wear discs resiliently engaging and sealing the intermediate portions of the backing discs adjacent their rims.

2. The line gripping pulley of claim 1 in which the margin of each wear disc is so shaped that until the assembled pulley is clamped together, the remainder thereof is spaced from the backing disc for that wear disc whereby the outer portion of the wear discs advance radially and resiliently engage and seat against the intermediate portion of the backing disc when the pulley is assembled.

3. A pair of identical steel wear discs for the line gripping pulley of a pot or like hauler for marine uses having a drive shaft with a free end and a flange close to but adjacent to said end, the pulley of the type having a pair of identical, relatively thin and resiliently flexible backing discs each of which has an inner flat portion having a hole to accommodate said shaft end and a circular series of holes by which the backing discs may be bolted to the shaft flange, an intermediate portion that is inclined away from the plane defined by the inner portion and an outer portion sharply curved to provide a rim extending away from said plane and with the rims extending away from each other, each wear disc resilient and relatively thin and flexible and including an inner flat portion to overlie the inner portion of a backing disc and an outer portion dimensioned to armor the intermediate portion thereof with the flat portion having an axial hole to accommodate said shaft end and a circular series of holes that correspond to those of the backing discs to enable the discs to be assembled to form a pulley with each wear disc held by the intermediate portions of the appropriate backing disc with the wear discs providing a narrow, V-shaped channel dimensioned at its mouth freely to receive the line, said wear discs so shaped that in the assembled pulley, at least their peripheries are in resilient sealing engagement with the backing discs.

4. The wear discs of claim 3 in which the margin of each outer portion is so shaped that when disposed against a backing disc, the remainder of those discs are spaced slightly apart whereby, when the backing and wear discs are clamped together to form a pulley, the outer portion of each wear disc advances radially and resiliently engages and seats against the intermediate portion of the disc by which it is backed.

* * * * *